United States Patent [19]

Gloe

[11] Patent Number: 4,936,003

[45] Date of Patent: Jun. 26, 1990

[54] IMPROVED SPLINED JOINT REMOVER

[76] Inventor: C. Wayne Gloe, 4214 W. Surrey, Phoenix, Ariz. 85029

[21] Appl. No.: 320,910

[22] Filed: Mar. 7, 1989

Related U.S. Application Data

[63] Continuation-in-part of Ser. No. 34,999, Apr. 6, 1987, abandoned.

[51] Int. Cl.[5] .............................................. B23P 19/04

[52] U.S. Cl. .......................................... 29/254; 29/275

[58] Field of Search ................. 29/254, 264, 255, 275; 81/463; 411/389, 427, 436

[56] References Cited

U.S. PATENT DOCUMENTS

| | | | |
|---|---|---|---|
| 236,723 | 1/1881 | Sellers | 411/427 |
| 341,146 | 5/1886 | Howes | 411/427 |
| 875,940 | 1/1908 | Mason | 29/254 |
| 1,364,489 | 1/1921 | Edelblut | 29/275 |
| 3,290,822 | 12/1966 | Mauset | 29/275 |
| 4,675,968 | 7/1987 | Bartlett | 29/254 |

*Primary Examiner*—Judy Hartman

*Attorney, Agent, or Firm*—Harry M. Weiss

[57] ABSTRACT

A tool is described for mounting and demounting splined joints, especially those found in the front-wheel drive assemblies of cars. A special tool is provided which can be inserted into the internally splined wheel hub rotatably fixed to the vehicle and which screws on to one end of the externally splined drive shaft portion being installed in the hub. The other end of the tool mounts to a slide hammer. When the slide hammer weight is banged against the tool or against the oppositely located hammer stop, the momentum impulse is transmitted to the splined shaft to push it out of or into the splined wheel hub, depending upon the direction of movement of the hammer weight. The tool is successful even with interference fit splined joints otherwise requiring large press forces for assembly or disassembly.

3 Claims, 3 Drawing Sheets

IMPROVED SPLINED JOINT REMOVER

This application is a continuation-in-part of copending application U.S. Ser. No. 034,999 titled "Splined Joint Remover and Installer", filed Apr. 6, 1987 now abandoned.

FIELD OF THE INVENTION

This invention relates to an improved means for joining and separating splined joints and more particularly, mounting and demounting tapered interference fit splined joints found in vehicle hubs without having to remove the supporting hub from the vehicle.

BACKGROUND ART

Splined joints are much used in vehicles and other machinery where it is necessary to provide transmission of rotational energy but also to be able to demount or separate the drive train components at a particular point. It has become increasingly common in vehicles to use such splined joints in drive assemblies at the point where the drive axle connects to the hub supporting the drive wheels. The wheel hub is held by bearings attached to the vehicle suspension. The hub rotates freely in response to the drive axle rotation, but is otherwise constrained in orientation by the suspension or the combination of the suspension and steering linkage of the vehicle.

This construction is especially found, for example, in front-wheel drive vehicles or in rear wheel drive vehicles where the differential or transmission is mounted to the car frame and articulated shafts couple to independently suspended drive wheels, or in vehicles providing a combination of front and rear drive. Frequently, an assembly referred to in the art as a constant velocity (CV) joint is located in the drive axle immediately behind the hub and hub support bearings. The axle shaft or the CV joint has an external spline which mates with an internal spline on the inside of the wheel hub, thus providing a demountable rotary connection between the drive train and the wheels of the vehicle or machine. In many vehicles an attachment means, such as for example a threaded extension is provided on the end of the splined shaft for holding the splined shaft and hub together.

In some cases the splines on the shaft and within the wheel hub are tapered and/or have an interference fit so that once assembled there is no slop or movement in the joint. Usually, considerable force is required to install or demount an interference fit splined shaft and hub. In the prior art, the assembly of such a joint could be accomplished by a puller which attached to the threaded extension on the splined shaft and pulled the splined shaft into the wheel hub. However, there has not been any method for demounting such an interference fit splined shaft and hub except by removing the hub from the vehicle and using an arbor press or similar apparatus for forcing the splined shaft out of the hub. Considerable additional labor is required to disassemble the hub from the vehicle for this purpose. Thus, a need continues to exist for an improved tool for demounting splined shafts, particularly interference fit splined shafts used in vehicles, without having to demount from the vehicle the bearing hub containing the outer spline.

Accordingly, it is an object of the present invention to provide an improved tool for quickly and easily demounting splined joints in drive trains of vehicles or machinery, and especially for interference fit joints in front-wheel drive vehicles.

It is an additional object of the present invention to provide a single tool of improved design which permits both mounting and demounting of splined joints without removing the hub holding the splined shaft from the vehicle or machine.

It is a further object of the present invention to provide an improved double acting installation and removal tool for splined joints in the front wheel drive assembly of vehicles.

It is an additional object of the present invention to provide an improved double acting installation and removal too for splined joints in front wheel drive vehicles which is particularly adapted for use with a double acting slide hammer.

As used herein, the words "spline" or "splined" is intended to refer to a shaft which has on its exterior longitudinal grooves and ridges dispersed around the circumference of the shaft, and generally intended to slide into a hollow opening having a mating arrangement of longitudinal ridges and grooves on its interior. As used herein, the word "hub" is intended to refer generally to a part held in an external assembly by bearings which allow free rotation of the part, and which has a central bore which is internally splined to accept a mating external spline on a drive shaft or CV joint to be attached thereto for the purpose of driving the hub. For Example, in a front-wheel drive vehicle, this hub corresponds to the wheel mounting hub supported by bearings in the front suspension and steering mechanism, which is driven by the drive train and to which the front drive wheels are attached.

SUMMARY OF THE INVENTION

These and other advantages and objectives are achieved by the present invention wherein there is provided a tool for removing and installing a fitting having an external tapered spline and a threaded extension, from within a hub having a mating internal tapered spline of a first predetermined internal diameter and first predetermined length, comprising, an elongated shaft, wherein the shaft has a first cylindrical portion adjacent a first end of the shaft, wherein the first cylindrical portion has a second predetermined external diameter smaller than the first internal diameter and a second predetermined length at least equal to about half of the first length, extending from said first end, wherein the shaft has a second tightening portion, preferably non-cylindrical so as to easily accept a wrench, extending from the cylindrical portion at least part way to a second end of the shaft opposite said first end, internally threaded first attachment means in the first end of the shaft for mating the shaft to the threaded extension, and threaded second attachment means at the second end of the shaft for mating the shaft to a hammer means, especially a slide hammer.

It is desirable that the tool shaft be is rotationally symmetric about a longitudinal axis and that the second attachment means be internally threaded and extend into the second end of the shaft coaxially with the longitudinal axis, and that the internally threaded second attachment means has a predetermined maximum third internal diameter. It is further desirable that the shaft comprises a third portion having an internal opening therethrough concentric with the second attachment means and having a fourth internal diameter larger than the third internal diameter and located between the second attachment means and the second end for preventing damage to the internal threads at that end.

The tightening or non-cylindrical portion of the shaft is desirably hex-shaped and has a width between opposed flats of the hex-shape, measured perpendicular to the long dimension of the elongated shaft, larger than the second diameter. A boss is desirably provided protruding from the second end and surrounding the second attachment means for absorbing blows from the hammer means while preventing damage to the second attachment means.

Where it is desired to us the tool for assembly or disassembly of front wheel drive hub splines of vehicles manufactured by the Ford Motor Company or others, it is desirably that the tool be sized so that the second diameter is about 0.93 inches, the attachment means comprises a 1.5–20 mm internal thread at least about one inch deep, the second attachment means comprises a $\frac{5}{8}$–18 internal thread at least about $\frac{3}{4}$th inch deep, and the tightening portion of the shaft is hexagonal shaped and has a length of at least one inch, and the opposed flats of the hex-shape are at least about 1–$\frac{5}{8}$th inch apart.

DETAILED DESCRIPTION OF THE DRAWINGS

Figure 1:
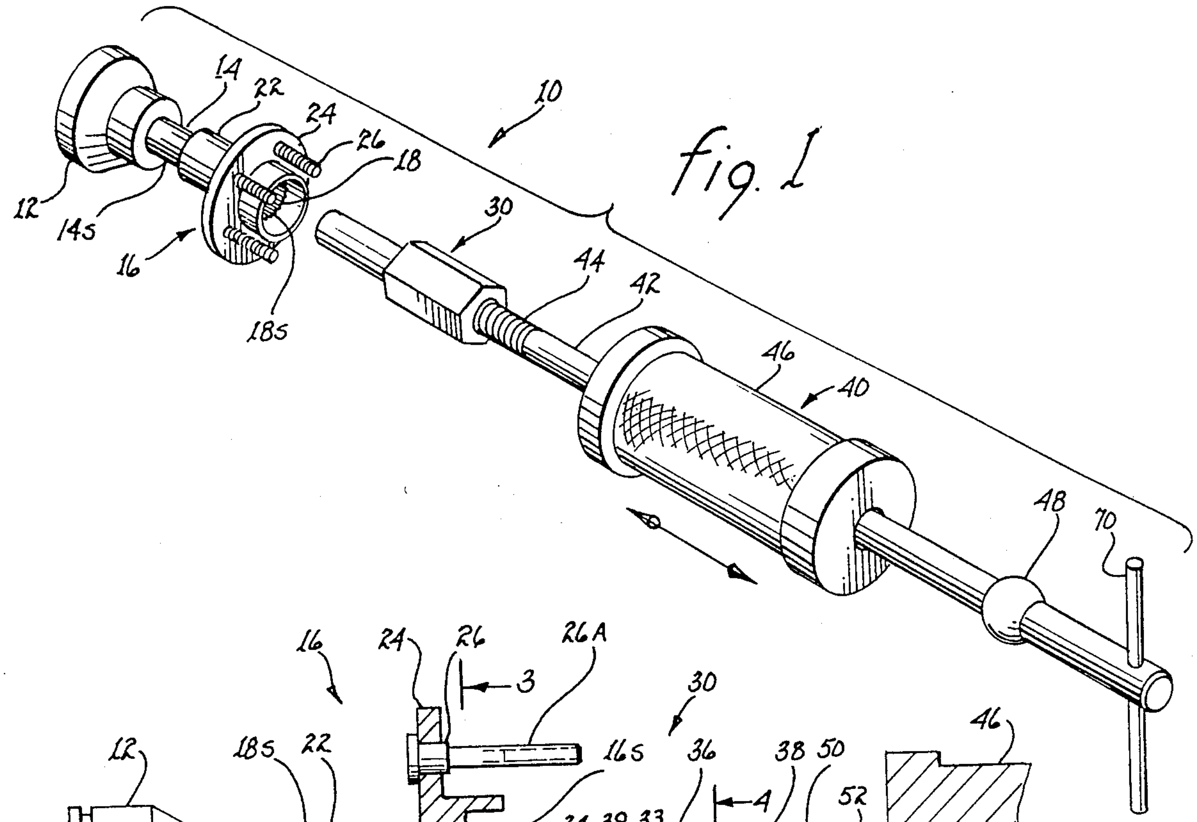
FIG. 1 is an exploded perspective view of the combination of a vehicle CV joint with a splined protrusion, a hub having an internal splined hole, and the tool of the present invention attached to the shaft of a slide hammer for mounting and demounting the splined joint.

FIG. 1 shows an exploded perspective view of combination 10 of CV joint 12 with splined extension 14, hub 16, installation/removal tool 30 according to the present invention, and slide hammer 40. Splined shaft or rod 14 extends from CV joint 12 and has longitudinal external splines 14S and threaded extension 15 (see FIG. 2). CV joint 12 is illustrated here merely for purposes of example and is not a part of this invention, although splined shaft 14 is commonly attached to such a CV joint, and invented tool 30 is particularly suited to mounting or demounting splined joints Which accompany such CV joints. For the purposes of this invention, CV joint 12 is considered merely a part of the drive train delivering power to splined shaft 14 which is desired to be mounted in or demounted from rotatable hub 16.

Splined shaft or rod 14 with external splines 14S fits within hole 18 in hub 16 having mating internal splines 18S which engage external splines 14S. Rod 14 and hole 18 may be straight or tapered. When tapered, they have a larger diameter larger at the ends closest to CV joint 12.

Figure 2:
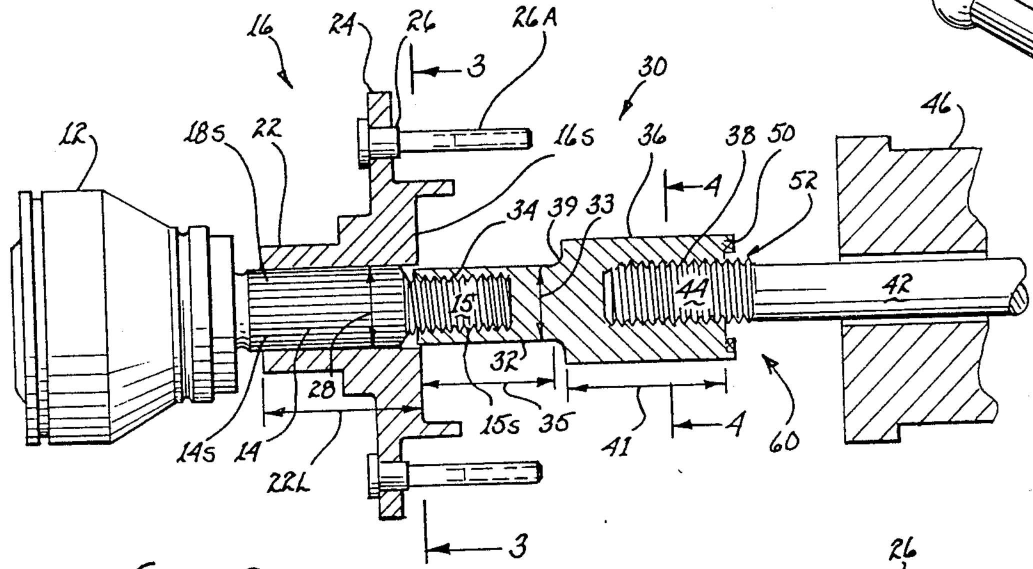
FIG. 2 is a partial cross-sectional view of the left-hand portion of the combination of FIG. 1 but with the mating splines engaged.

Hub 16 has external support hub bearing surface 22, hub flange 24 with holes 26 and wheel attachment means 26A. Surface 22 is where the bearings are attached for holding hub 16 in the suspension or steering mechanism of the vehicle. The particular method for attaching hub 16 to the vehicle or machine is not a part of this invention, and the present invention is applicable with any internally splined rotatable hub however attached to the vehicle or machine. Shaft or rod 14 extending from CV joint 12 generally has some means for providing a nut or screw to hold shaft 14 within hub 16 so that it is not loosened by road vibration. This is illustrated in FIGS. 1 and 2 by externally threaded extension 15 at the end of splined shaft 14.

Many existing splined joint assemblies, use an interference fit. That is, the relatives size and/or taper of rod 14 and hole 18 and splines 14S and 18S are such that splines 14S and 18S begin to interfere before they are fully engaged and considerable force is required to force splined shaft 14 into or out of splined hub 16. This assembly/disassembly force can be as much as 10,000 pounds in some cases. Larger or smaller values of assembly forces are also used. Since this force is often many times what can be directly exerted by a worker, a force amplifying tool is required to provide the necessary mounting or demounting force.

When the assembly/disassembly force is large, as is the case for example with splined front-wheel drive joints in vehicles manufactured by the Ford Motor Company and others, then a hydraulic or arbor press has been used in the prior art to assemble and/or disassemble splined shaft 14 from bearing hub 16. This has the disadvantage that the hub must be removed from the vehicle to permit the joint-hub assembly to be placed in the press. This is not desirable.

Alternatively, a puller has sometimes been used in the prior art. This puller attaches to threaded extension 15 and has a threaded shaft extending away from hub 16. A sleeve is passed over the threaded shaft so as to bear against surface 16S of hub 16. A washer and nut are placed over the threaded shaft and tightened in the direction toward hub 16. The nut and washer bear against the sleeve and pull extension 15 and splined shaft 14 through hub 16 until they are fully engaged.

Using such a prior art puller, splined shaft 14 may be assembled in hub 16. However, such a prior art puller does not permit disassembly of the assembled splined joint, since backing off on the puller nut does not apply any counter force to the assembled parts. Accordingly, it has still been necessary to remove the hub from the vehicle in order to place it in a press and press out splined shaft 14 to separate shaft 14 and hub 16. Once the hub has been removed from the vehicle, it is easier to use the press again for reassembly rather than the prior art puller previously described. Accordingly, prior art pullers have not been convenient to use, since they are one-way tools. This limitation is overcome by the means of the present invention.

Tool 30 according to the present invention has cylindrical first portion 32 of outside diameter 33 and length 35. Diameter 33 of portion 32 is sized to fit within hole 18 in hub 16, within splines 18S. Attachment means 34 in the form, for example of internal threads, is provided in the end of portion 32 to mate with, for example, external threads 15S on extension 15 to shaft 14.

Length 35 of portion 32 is conveniently about the same as length 22L of hub 16. However, smaller and larger lengths can also be used. For example even before splines 14S and 18S engage, extension 15 protrudes part way through hole 18. Also, where shaft 14 and hole 18 are tapered, then shaft 14 can be inserted part way into hole 18, even when there is an interference fit, without requiring any substantial force. Thus, length 35 can be less than length 22L with at least about one-half of length 22 being desirable. It is convenient that length 35 be in the range from about one-half to one times length 22L. It is generally not desirable to have length 35 substantially longer than length 22L, e.g. several times length 22L or more. Other things being equal, keeping tool 30 short makes it stiffer so that it does not bend substantially when hammered by weight 46 on slide hammer 40.

Tool 30 has second portion 36 extending, except for fillet 39, distance 41 from first portion 32 to end 60. Second portion 36 serves as a convenient means for tightening tool 30 on shaft 14 and on hammer 40. Portion 36 is desirably non-cylindrical, e.g., hexagonal shaped in order to accept a wrench, but need not be so, since other tightening means will also serve. Second portion 36 has second attachment means, for example, threads 38 inwardly running from end 60, in order to couple matching threads on portion 44 of shaft 42 of hammer 40 to tool 30. Where second portion 36 is hexagonal, then it is desirable that distance 37 between flats 36A-B or the diameter of circumscribed circle 36C be larger than diameter 33 of first portion 32 (see FIG. 2).

Slide or impulse hammer 40 comprises shaft 42 with threaded end 44, movable weight 46, stop 48, and handle 70. After shaft 14, tool 30, and hammer 40 have been connected together, when it is desired to remove a previously installed splined shaft from hub 16, weight 46 is sharply struck one or more times against end 60 of tool 30. When it is desired to install a previously separated shaft 14 and hub 16, weight 46 is sharply struck one or more times against stop 48. These actions transmit abrupt impulses of force to the combination of shaft 14 and hub 16 tending, respectively, to drive them apart or together.

Figure 4:
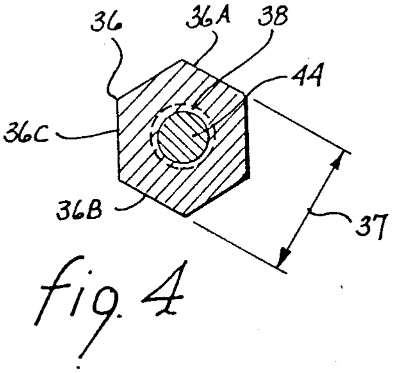
FIGS. 3 and 4 are simplified cross-sectional views of portions of the assembly of FIG. 2.
Figure 3:
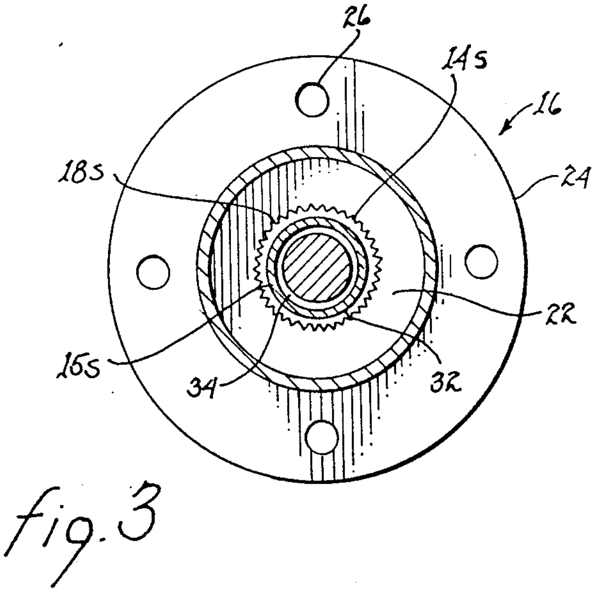

Because tool 30 must be repeatedly struck by hammer weight 46 during the course of its use, it is desirable that end 60 of tool 30 be relieved at 52 surrounding threads 38 and/or be provided with boss 52 so that the repeated hammer blows do not damage threads 38. For example, were this relief and/or boss not provided, repeated hammering on end 60 might cause the metal thereof to be slightly peened in causing threads 38 and 44 to bind, thereby making it difficult to connect and disconnect tool 30 from hammer 40. Also, while FIGS. 1-2 and 4 illustrate the use of screw threads for coupling hammer 40 to tool 30, other means may also be used provided that such means transmit bi-directional impulses between hammer 40 and tool 30.

Similarly, while FIGS. 1-2 illustrated the situation where splined shaft 14 is attached to tool 30 by means of externally threaded extension 15 to shaft 14 and internally threaded attachment means 34 in tool 30, other attachment means could also be used depending upon what was required for coupling to shaft 14. For example, where shaft 14 is internally threaded at the end instead of externally threaded, then tool 30 would desirably have an externally threaded portion at the left end to mate with the internally threaded portion at the end of shaft 14. Similarly, other attachment means may also be employed provided that they transmit force bi-directionally.

Typical dimensions of a convenient tool suitable for use with front-wheel drive Ford and other front-wheel drive vehicles are as follows: thread 34 in portion 32 of tool 30 is desirably a 1.5–20 mm type metric internal thread to fit a matching external thread on extension 15 and with a length parallel to the longitudinal axis of tool 30 of conveniently about one inch; thread 38 in portion 36 of tool 30 is desirably an internal $\frac{5}{8}$–18 thread matching the external thread on portion 44 of shaft 42 of slide hammer 40 and with a length parallel to the longitudinal axis of tool 30 of about $\frac{3}{4}$th inch; portion 32 of tool 30 desirably has outside diameter 33 of about 0.93 inches so as to fit within internal diameter 28 of spline 18S of hub 16; non-cylindrical portion 36 is desirably hexagonal with distance 37 between flats of about 1–$\frac{5}{8}$th inch to accept a standard wrench; cylindrical portion 32 of tool 30 is desirably about 2–$\frac{1}{2}$inch long, tightening portion 36 is desirably about 1–$\frac{1}{8}$th inch long; small fillet 39 having a radius of about 0.1 inch is provided at the juncture of portions 32 and 36; and threads 38 are relieved at 52 below end 60 of tool 30 and/or boss 50 extends from end 60 of tool 30 by about 1/16th inch to prevent damage to threads 38 by repeated blows of hammer weight 46 on end 60.

Type 4140 steel is a convenient material for fabricating tool 30. Tool 30 should be heat treated to a Rockwell Hardness of, for example, about R-42C so as to withstand repeated hammer blows and repeated attachments to and dis-attachments from shafts 14 and 44.

In use, tool 30 is inserted in the wheel side (right) of hub 16 and shaft 14 inserted into the frame side (left) of hub 16 and threads 34 and 15 engaged by screwing tool 30 onto extension 15. Tool 30 may have been previously attached to slide hammer 40 or slide hammer 40 may be attached after tool 30 is coupled to extension 15. Handle 70, on hammer 40 is conveniently provided for making connection with hex portion 36 of tool 30 using threads 38, 44 or equivalent.

Once shaft 14, tool 30, and impulse hammer 40 are attached, then weight 46 on hammer 40 is moved sharply in the desired direction, e.g., to the right in FIGS. 1-2 in order to assemble or mount splines 14S, 18S, or to the left to disassemble or demount splines 14S, 18S, in hub 16. It will be noted that at no time does hammer 40 or tool 30 apply any force directly against hub 16, as with the prior art tools or presses. Mounting or demounting of the splines 14S. 16S is accomplished by momentum transfer. The inertial reaction of hub 16 opposes the impulse transferred from weight 46 to shaft 42 and through tool 30 to extension 15 and shaft 14. Thus, shaft 14 and splines 14S move to the right or left into or out of hub 16 depending on the direction of the impulse provided by hammer 40. This is a particular feature of the present invention. This also saves wear and tear on hub 16 since no installation tool or press bears against hub 16, as in the prior art.

It has been found in practice that the invented tool makes it possible to remove and/or reinstall a splined coupling in the front-wheel drive assembly of a Ford or other vehicle in matter of minutes without having to remove the hub assembly from the vehicle or change tools between demounting and re-mounting. This is the case even though a large force is ordinarily required to deal with the interference fit. This is a significant advantage as compared to the prior art. For example, where a press force of about 10,000 pounds was specified for the interference fit, the splined shaft and hub could be disassembled and assembled using a slide hammer of modest weight, easily handled by an average worker, typically only about 5 to 7 pounds. This is a substantial advantage.

It will be apparent to those of skill in the art, based upon the foregoing description, that the invention described herein provides an improved tool and method for mounting and/or demounting splined joints in drive systems, particularly the drive systems of vehicles, and especially the front-wheel drive systems of many cars which otherwise require large forces to mount or demount an interference fit spline joint. Further the means and method of the present invention accomplishes both installation and removal with a single bi-directionally acting tool that is especially suited for use with slide or impulse hammers. The invented tool is easy to use and inexpensive to manufacture, and the invented method is simple and quick.

Those of skill in the art will also appreciate, based on the foregoing, that modifications may be made in the configuration of the present invention without departing from the spirit thereof. For example, while it is convenient to make second portion 36 of tool 30 non-cylindrical for the purpose of accepting a wrench for tightening tool 30 to shafts 14 and 42, the same function may be provided by a hole drilled through tool 30 at right angles to its long dimension no matter What the cross-sectional shape of portion 36. Then a rod is provided through the hole in much the same manner as rod or handle 70 in shaft 42 of hammer 40. This allows tool 30 to be tightened to shafts 14 and 42 in the same way as with a separate wrench.

Also, the means provided in tool 30 for attaching shafts 14 and 42 may be varied according to the variations in the nature of shafts 14 and 42, so long as the attachment means provide bi-directional impulse transfer.

Figure 5:
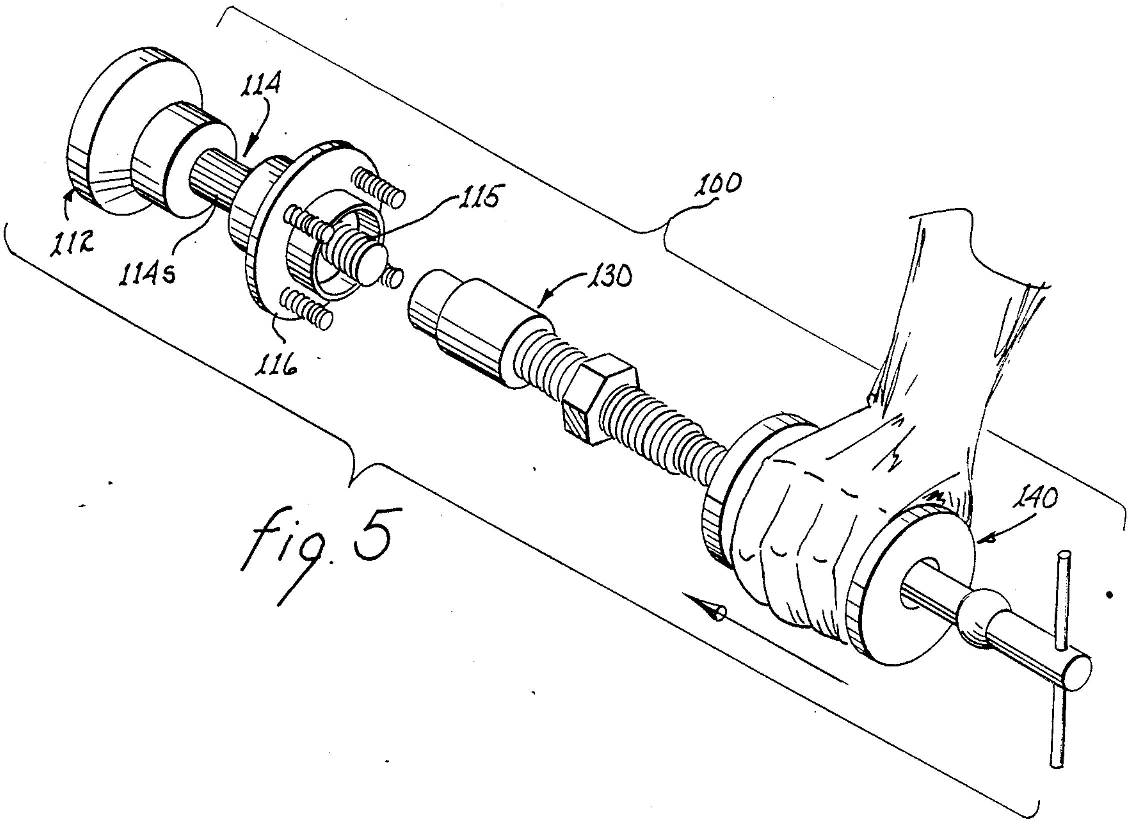
FIG. 5 is an exploded perspective view similar to FIG. 1, but depicting another tool embodiment.

In FIG. 5, reference numeral 100 general depicts the illustrated combination of CV joint 112 with splined extension 114, hub 116, another embodiment of a installation/removal tool 130, and slide hammer 140. The splined shaft or rod 114 extends from the CV joint 112 and has longitudinal external splines 114S and a threaded extension portion 115.

Figure 6:
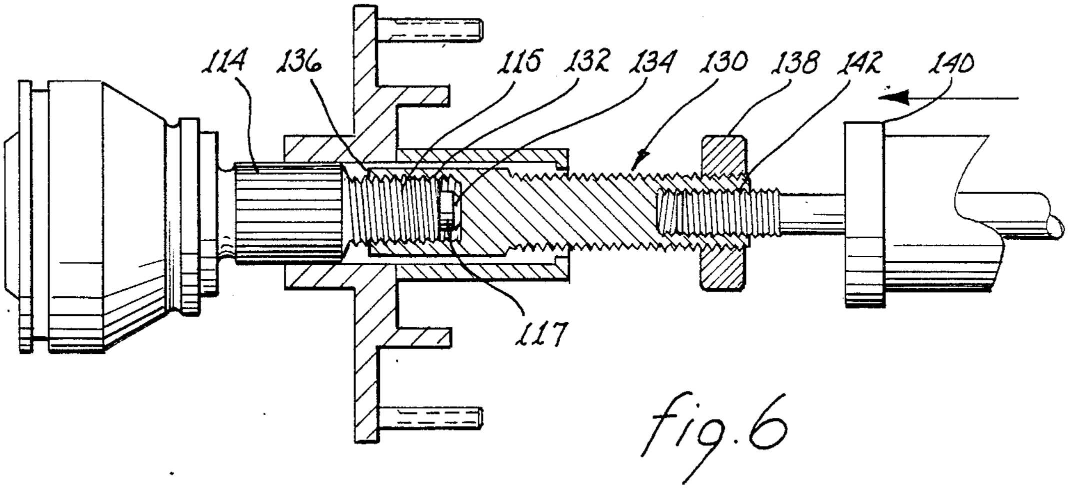
FIG. 6 is a partial cross-sectional view of a portion of the apparatus shown in FIG. 5, but with the tool engaged and ready for demounting the splined joint.

In FIG. 6, the tool 130 has a first internally threaded portion 132 and a flat bore portion 134 located at closed end of the first internal threaded portion 132 which serves to meet a CV joint shaft end 117 for the purpose of providing a solid and continuous joint with no space between the flat bore portion 134 and the CV joint shaft end 117. Thus, rim end portion 136 of the first internal threaded portion 132 does not contact the splined portion 114 of the CV joint shaft which comprises elements 114, 114S, 115 and 117. This gap prevents damage to the splined portion 114. Nut 138 is located at an end of the tool 130 and the external slide hammer 140 is threadedly attached to a second internally threaded portion 142 which serves to make the tool 130 ready for demounting the splined CV joint.

Figure 7:
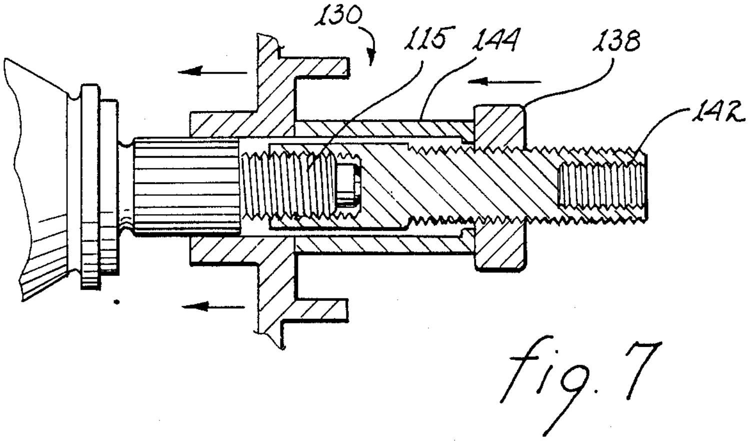
FIG. 7 is a partial cross-sectional view similar to FIG. 6, but with the tool engaged and ready for mounting the splined joint.

In FIG. 7, the nut 138 is located in contact with an end of sleeve portion 114 of the tool 130 ready for mounting a new splined CV joint. This is achieved by tightening the nut 138 with an appropriate external wrench means (not shown). The second internally threaded portion 142 is also shown.

Figure 8:
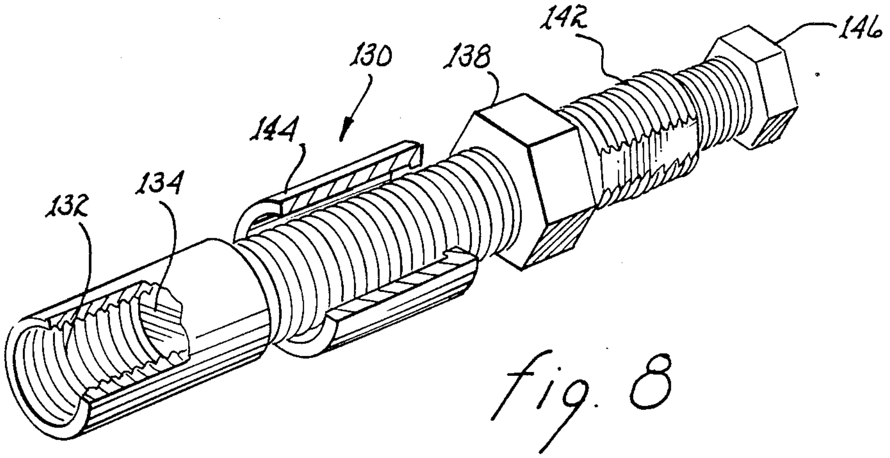
FIG. 8 is a perspective view, with parts broken away, of the tool of FIGS. 5, 6 and 7.

In FIG. 8, bolt portion 146 is threadedly attached to the second internally threaded portion 142 of the tool 130 in order to permit the tool 130 to be used without the slide hammer 140 of FIG. 5. Thus, the end of the bolt 146 can be struck with any conventional hammer and thereby avoid the need or use of the slide hammer 148.

Figure 9:
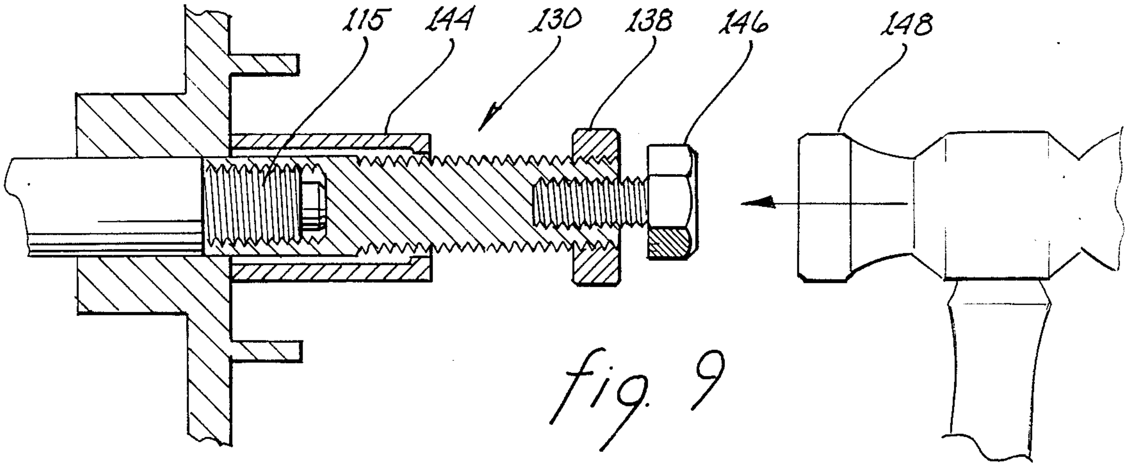
FIG. 9 is a view partly in cross-section similar to FIG. 6, but with a somewhat different tool engaged and ready for demounting using an external different hammer means than the one shown in FIG.

In FIG. 9, the tool 130 is shown engaged and ready for demounting the splined CV joint using a different, simpler external hammer means 148 against the threadedly attached bolt portion 146, thus, demounting of the splined CV joint is easily achieved.

Figure 10:
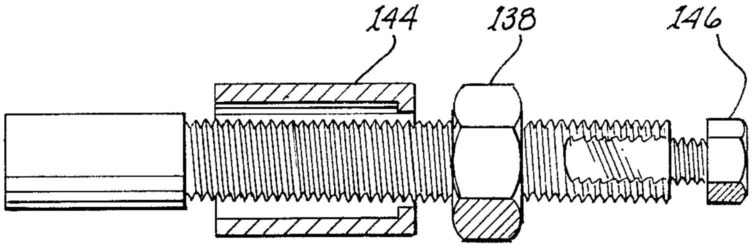
FIG. 10 is a view partly in cross-section view of the tool shown in FIG. 9.

FIG. 10 shows the tool 130 in a position similar to the position shown in FIG. 8.

I claim:

1. A tool for removing and installing a fitting, having an external spline and a threaded extension, from within a hub of a vehicle without removing said hub from said vehicle, said hub having an internal spline that mates with said external spline of said fitting, comprising:

- an elongated, substantially cylindrical shaft having a first end sized to fit within said internal spline of said hub without touching said internal spline and having a second end opposite said first end;
- internally threaded first attachment means in said first end of said shaft having an open end for receiving said threaded extension and having a closed end with a flat bore portion;
- means, having an externally threaded portion at one end and a striking surface member at the other end, for facilitating removal and installation of said fitting;
- internally threaded second attachment means, in said second end of said shaft, for receiving said externally threaded portion of said facilitating means; and
- separate hammer means for use with one hand to strike said striking surface member.

2. The tool of claim 1 wherein said striking surface member is hexagonal.

3. The tool of claim 1 wherein said facilitating means is a threaded bolt.

* * * * *